(12) United States Patent
Xu et al.

(10) Patent No.: US 10,498,211 B2
(45) Date of Patent: Dec. 3, 2019

(54) WINDING-TYPE PERMANENT MAGNET COUPLING TRANSMISSION DEVICE

(71) Applicant: JIANGSU MAGNET VALLEY TECHNOLOGIES CO., LTD., Zhenjiang, Jiangsu (CN)

(72) Inventors: Junfeng Xu, Jiangsu (CN); Fuxing Qi, Jiangsu (CN)

(73) Assignee: JIANGSU MAGNET VALLEY TECHNOLOGIES CO., LTD., Zhenjiang (CN)

( * ) Notice: Subject to any disclaimer, the term of this patent is extended or adjusted under 35 U.S.C. 154(b) by 259 days.

(21) Appl. No.: 15/329,345

(22) PCT Filed: Jul. 30, 2015

(86) PCT No.: PCT/CN2015/085565
§ 371 (c)(1),
(2) Date: Jan. 26, 2017

(87) PCT Pub. No.: WO2016/015665
PCT Pub. Date: Feb. 4, 2016

(65) Prior Publication Data
US 2017/0222537 A1  Aug. 3, 2017

(30) Foreign Application Priority Data

Jul. 30, 2014 (CN) .......................... 2014 1 0371448
Mar. 30, 2015 (CN) .......................... 2015 1 0146217

(51) Int. Cl.
*H02K 49/02* (2006.01)
*H02K 49/10* (2006.01)
(Continued)

(52) U.S. Cl.
CPC .......... *H02K 49/106* (2013.01); *H02K 1/223* (2013.01); *H02K 49/02* (2013.01); *H02K 49/06* (2013.01);
(Continued)

(58) Field of Classification Search
CPC .... H02K 16/005; H02K 16/02; H02K 16/025; H02K 51/00
See application file for complete search history.

(56) References Cited

U.S. PATENT DOCUMENTS 5,477,094 A    12/1995 Lamb
5,654,602 A *   8/1997 Willyoung ............... H02K 3/28
                                              310/179
(Continued)

FOREIGN PATENT DOCUMENTS

CN    101345468    1/2009
CN    101465592    6/2009
(Continued)

OTHER PUBLICATIONS

Office Action dated Sep. 23, 2016 and English translation from corresponding application No. CN 201510146217.8.
(Continued)

*Primary Examiner* — Dang D Le
(74) *Attorney, Agent, or Firm* — Hauptman Ham, LLP (57) ABSTRACT

A winding type permanent magnet coupling transmission device includes a permanent magnet rotor and a winding rotor that is coaxial with the permanent magnet rotor and capable of rotating relative to the permanent magnet rotor. An air gap exists between the permanent magnet rotor and the winding rotor. The winding rotor is connected to a control structure capable of regulating the current/voltage of the winding rotor. The control structure is capable of controlling the current or voltage of the winding rotor, so as to
(Continued)

regulate the output torque of the transmission device, with no need to configure any corresponding mechanical execution mechanism. Therefore, the transmission device has a simple structure and small energy loss.

17 Claims, 6 Drawing Sheets

(51) Int. Cl.
 *H02K 1/22*  (2006.01)
 *H02K 49/06*  (2006.01)
 *H02K 51/00*  (2006.01)
 *H02K 16/00*  (2006.01)

(52) U.S. Cl.
 CPC ........... *H02K 51/00* (2013.01); *H02K 16/005* (2013.01); *H02K 2213/03* (2013.01)

(56) References Cited

U.S. PATENT DOCUMENTS

| | | | | |
|---|---|---|---|---|
| 6,501,190 B1 * | 12/2002 | Seguchi | ............ | B60K 6/26 |
| | | | | 180/65.26 |
| 6,501,205 B1 * | 12/2002 | Asao | ............ | H02K 3/12 |
| | | | | 310/184 |
| 7,265,470 B1 * | 9/2007 | Paden | ............ | F16F 6/005 |
| | | | | 310/103 |
| 2014/0125188 A1 * | 5/2014 | Marvin | ............ | H02K 1/148 |
| | | | | 310/208 |

FOREIGN PATENT DOCUMENTS

| | | |
|---|---|---|
| CN | 101931309 | 12/2010 |
| CN | 102364824 | 2/2012 |
| CN | 102497085 | 6/2012 |
| CN | 104135136 | 11/2014 |
| CN | 104767357 | 7/2015 |
| CN | 204465317 | 7/2015 |
| DE | 202010013455 | 12/2010 |
| JP | 51-44255 | 11/1976 |
| JP | 10-268946 | 10/1998 |
| WO | WO 0156138 | 8/2001 |

OTHER PUBLICATIONS

Office Action dated Mar. 27, 2017 and English translation from corresponding application No. CN 201510146217.8.
Office Action dated Aug. 4, 2017 and English translation from corresponding application No. CN 201510146217.8.
Extended European Search Report dated Feb. 19, 2018 from corresponding application No. 15826345.9.
Australian Examination Report dated Feb. 20, 2018 from corresponding application No. AU 2015295926.
Office Action dated May 15, 2018 from corresponding application No. JP 2017-504812.
International search report dated Oct. 23, 2015 and English translation from corresponding application No. PCT/CN2015/085565.

* cited by examiner

WINDING-TYPE PERMANENT MAGNET COUPLING TRANSMISSION DEVICE

RELATED APPLICATIONS

The present application is a National Phase of International Application Number PCT/CN2015/085565, filed Jul. 30, 2015, and claims the priority of China Application No. 201410371448.4, filed Jul. 30, 2014; and China Application No. 201510146217.8, filed Mar. 30, 2015, which are incorporated herein by reference in their entireties.

TECHNICAL FIELD

The present invention relates to the technical field of permanent magnet coupling transmission, and in particular, relates to a winding-type permanent magnet coupling transmission device.

BACKGROUND

At present, in the aspect of speed regulation of large rotation machineries, the permanent magnet speed regulating devices (sometimes referred to as the permanent magnet coupler or permanent magnet eddy current speed governor or the like) have gain recognition and favorable comments. These devices have the following major characteristics: (1) The torque is transmitted via an air gap, and no mechanical contact is needed. (2) Stepless speed regulation may be achieved. (3) Light-load soft startup is implemented, and the impacts caused by the motor to the power grid are reduced. (4) The load vibration is isolated, and the damages caused by the load to the device are mitigated. (5) The over-load protection function is implemented. (6) Safety and reliability are ensured, and the repair rate and maintenance cost of the device are reduced. (7) No electromagnetic wave interference is caused. A representative of such devices is the product manufactured by *Magna* Force, Inc., in the United States (U.S. Pat. No. 5,477,094). The permanent speed regulating device disclosed in this patent works based on the following principles: the conductor rotor disc and the permanent magnet rotor disc move relatively to each other, the conductor rotor disc rotatably cuts the magnetic lines in the alternating magnetic field generated by the permanent magnet rotor disc to generate an induction eddy current, the induction eddy current generates a reverse inductive magnetic field, and the inductive magnetic field interacts with the magnetic field of the permanent magnet disc, such that an electromagnetic torque is generated between the conductor rotor disc and the permanent magnet rotor disc. The electromagnetic torque is reduced by regulating the size of the air gap between the two rotor discs or regulating the coupling area between the two rotor discs with respect to a cylinder structure.

In addition, China Patent Application CN101931309A discloses a highly-efficient permanent magnet coupling device for transmission shaft, comprising at least one armature winding rotor disc and a mated armature winding disc shaft coupling mechanism, at least one permanent magnet rotor disc and a mated permanent magnet disc coupling mechanism, and corresponding input and output shaft couplers; wherein the armature winding rotor disc comprises at least one group of armature windings and an armature winding installing disc for mounting the armature windings, and the armature windings are nested or mounted in an armature slot arranged on one side of the armature winding installing disc; the permanent magnet rotor disc comprises a group of at least two permanent magnets and a permanent magnet installing disc for mounting the permanent magnets, and the permanent magnets are respectively N and S polar-alternately and uniformly nested or mounted on the circumference of the permanent magnet installing disc; the side of the armature winding rotor disc provided with the armature windings face towards the side of the permanent magnet rotor disc provided with the permanent magnets, to form electromagnetic coupling installation centering the center line of the same axis; an air-gap spacing is defined between the armature winding rotor disc and the permanent magnet rotor disc, and the armature winding rotor disc is linked to the corresponding input shaft coupler or output shaft coupler via the mated armature winding disc shaft coupling mechanism, and the permanent magnet rotor disc is linked to the corresponding output shaft coupler or input shaft coupler via the mated permanent magnet disc shaft coupling mechanism. This patent further discloses five specific solutions of the armature winding structure (for example, see claim 3). Overview of all these five solutions finds that "the head end and the tail end are short-circuited" inside the rotor disc to form a "closed-loop short-circuit coil". The working principles are the same as the product manufactured by Magna Force, Inc. The difference lies in that the eddy current in the conductor rotor disc is "combined" to the interior of the armature winding coil. The air-gap spacing between the armature winding rotor disc and the permanent magnet rotor disc determines the electromagnetic torque that may be transmitted therebetween. That is, the techniques disclosed in the prior art all teach regulating the torque by regulating the air gap between two rotors. Since the output torque is in a positive proportion to the load, coupling of the transmission shafts or regulating the transmission torque and driving the load is achieved. Therefore, the air gap between the rotor discs in each permanent magnet coupling assembly is regulated, and thus the load rotation speed is regulated.

As well known, in the permanent magnet speed regulation techniques, a rotation speed difference needs to be present between the permanent magnet rotor and the conductor rotor; otherwise, no electromagnetic torque is generated between two rotor discs. That is, the input rotation speed n1 is constantly greater than the output rotation speed n, and then the rotation speed difference s is equal to (n1−n)/n1. This formula is transformed into n=n1(1−s). It is apparent that the input rotation speed n1 may not be changed with respect to the permanent magnet speed regulating device. As seen from the above formula, if the output rotation speed n is to be changed, that is, the speed regulating function needs to be implemented, the rotation speed difference s needs to be changed. In other words, the rotation speed regulation by the permanent magnet speed regulating device is essentially rotation speed regulation, i.e., slip speed regulation. The speed regulation is based on the principles of changing s by changing the output torque, wherein when the output torque is smaller than the load torque, the rotation speed is lowered, and on the contrary, the rotation speed is increased. In the prior art, two approaches are available for changing the output torque. One is to change the magnetic flux area between the permanent magnet rotor and the conductor rotor. The other is to change the air gap between the permanent magnet rotor and the conductor rotor. However, these two approaches both need a mechanical execution mechanism. However, configuration of the mechanical execution mechanism not only makes the structure of the transmission device more complicated, but also increases the volume and improves the subsequent maintenance workload.

In addition, in the prior art, such a rotation speed regulating device is subject to a great slip power loss. If the mechanical loss and stray loss are ignored, the slip power and the output power satisfy the following formula: Pm=sPm+(1−s)Pm. In the formula, Pm denotes the input power, sPm denotes the slip power, and (1−s)Pm denotes the output power. As seen from the above formula, when the input power Pm is not changed, a greater s indicates a greater slip power sPm and a smaller output power (1−s)Pm. In the permanent magnet speed regulating device in the prior art, the slip power sPm is dissipated as heat energy on the device. Therefore, when the regulated speed of the permanent magnet speed regulating device is greater, more heat is generated. For example, when s=0.5 (that is, speed regulation by 50%), if the mechanical loss and stray loss are ignored, the transmission efficiency of the permanent magnet speed regulating device is only 50%. Therefore, such permanent magnet speed regulating device is defective in the working principles in terms of low transmission efficiency and great energy loss.

SUMMARY

In view of the above, the technical problem to be solved by the present invention is that in the permanent magnet speed regulating device in the prior art, when the output torque is changed, a mechanical execution mechanism needs to be arranged, and thus the structure is complicated and the volume is increased, thereby increasing the work load of subsequent maintenance. In addition, the slip power is subjected to loss; in the case where the input power is constant, a greater slip power indicates a small output power; the slip power is directly dissipated in the form of heat energy; and when the permanent magnet speed regulating device has a greater speed regulation amplitude, more heat is generated, the transmission efficiency of the permanent magnet speed regulating device is lower and the energy loss is greater. The present invention accordingly provides a winding-type permanent magnet coupling transmission device having simple structure, less energy loss and high transmission efficiency.

To solve the above technical problem, the present invention provides a winding-type permanent magnet coupling transmission device, comprising a permanent magnet rotor and a winding rotor that is coaxial with the permanent magnet rotor and capable of rotating relative to the permanent magnet rotor, an air gap existing between the permanent magnet rotor and the winding rotor; wherein the winding rotor is connected to a control structure capable of regulating a current/voltage of the winding rotor.

The control structure is connected to the winding rotor via a collector ring and a carbon brush.

The control structure comprises a deflector capable of regulating the current of the winding rotor.

The deflector is configured to regulate the current of the winding rotor by recycling or consuming slip power. Specifically, the deflector may regulate current of the winding rotor by recycling or consuming slip power; wherein the consumption may be inner consumption of the windings or outer consumption, and the recycling may be recycling power to the power grid or recycling power to the other electricity-consuming or energy storage devices.

A controllable electromotive force is introduced to the deflector to regulate the current of the winding rotor.

The permanent rotor comprises a permanent magnet and a housing; wherein the permanent magnet comprises a plurality of permanent magnet arrays that mate with each other to form a radial magnetic pole, the plurality of permanent magnet arrays being in an alternate arrangement, and the permanent magnet forms a single-sided magnetic field.

The permanent magnet array comprises a first permanent magnet array that is radially arranged and a second permanent magnet array that is circumferentially orthogonally arranged relative to the first permanent magnet array.

The first permanent magnet array comprises a first unitary magnetic block and a second unitary magnetic block that are spacedly arranged in pair, directions of magnetic fields of the first unitary magnetic block and the second unitary magnetic block being respectively an inner direction and an outer direction along a radius direction of the permanent magnet; the second permanent magnet array comprises a third unitary magnetic block and a fourth unitary magnetic block that are spacedly arranged in pair, directions of magnetic fields of the third unitary magnetic block and the fourth unitary magnetic block being respectively a clockwise direction and a counterclockwise direction along a circumferential tangential direction of the permanent magnet; wherein the first unitary magnetic block is arranged between the third unitary magnetic block and the fourth unitary magnetic block that neighbor to each other, and the fourth unitary magnetic block is arranged between the first unitary magnetic block and the second unitary magnetic block that neighbor to each other.

The permanent magnet further comprises 2n permanent magnet arrays (n=1, 2, 3 . . . ) nested between the first permanent magnet array and the second permanent magnet array, wherein these permanent magnet arrays act with the first and second permanent arrays to form the single-sided magnetic field.

The magnetization intensity vector M of the unitary magnetic bock of the permanent magnet array varies regularly, that is, θm=(1+p)θ or θm=(1−p)θ(p=1, 2, 3 . . . ). In the equation, p denotes the number of pole pairs, θm denotes an included angle between the magnetization intensity vector M and the X axis, and θ denotes an included angle between the radius of a sector unitary magnetic block and the X axis.

The permanent magnet array further comprises a third permanent magnet array nested between the first permanent magnet array and the second permanent magnet array; wherein directions of magnetic fields of the first permanent magnet array, the second permanent magnet array and the third permanent magnet array respectively form a first included angle, a second included angle and a third included angle that are not obtuse angles, with the corresponding radii, angle differences between the first included angle, the second included angle and the third included angle being respectively 45 degrees.

The third permanent magnet array comprises a fifth unitary magnetic block, a sixth unitary magnetic block, a seventh unitary magnetic block and an eighth unitary magnetic block that are sequentially spacedly arranged; wherein the fifth unitary magnetic block is nested between the third unitary magnetic block and the first unitary magnetic block, the sixth unitary magnetic block is nested between the first unitary magnetic block and the fourth unitary magnetic block, the seventh unitary magnetic block is nested between the fourth unitary magnetic block and the second unitary magnetic block, and the eighth unitary magnetic block is nested between the second unitary magnetic block and the third unitary magnetic block.

The winding rotor comprises a core and coil windings wound on the core in a fractional slot concentrated winding manner, a coil pitch of the coil windings being set to 1.

The number q of slots per pole per phase is ¼ to ½.

The coil windings are arranged to be double-layer windings or single-layer windings.

The core is arranged to be a laminated core, a plurality of slots for winding of the coils being formed on the laminated core.

The core is arranged to be a wound core, a plurality of slots for winding of the coils being formed on the wound core.

The number of slots is set to 3n (n=1, 2, 3 . . . ).

The core is made from an electrical silicon steel sheet.

Compared with the prior art, the technical solutions provided in the embodiments of the present invention achieves the following merits:

1. In the present invention, the winding rotor is connected to a control structure that is capable of regulating the current/voltage of the winding rotor. The winding-type permanent magnet coupling transmission device in the present invention modifies the concept of regulating the torque by using a mechanical structure in the prior art, and regulating the current/voltage of the winding rotor by smartly arranging a winding rotor and using the control structure of the winding rotor, thereby changing the torque. The control structure in the present invention is capable of controlling the current or voltage of the winding rotor, so as to regulate the torque of the transmission device, with no need to configure any corresponding mechanical execution mechanism. Therefore, the transmission device has a simple structure and a small volume, and can be simply maintained.

2. In the present invention, the control structure comprises a deflector capable of adjusting the current of the winding rotor. Specifically, the deflector may regulate current of the winding rotor by recycling or consuming slip power; wherein the consumption may be inner consumption of the windings or outer consumption, and the recycling may be recycling power to the power grid or recycling power to the other electricity-consuming or energy storage devices. With no problem of loss and heat generation of the slip power theoretically present in the permanent magnetic speed governor technology in the prior art, no heat dissipater and complicated air-cooling or water-cooling system are needed.

3. In the present invention, the deflector may also be introduced with a controllable electromotive force to regulate the current of the winding rotor. The winding rotor is connected to a control device, and the control device is introduced with a controllable electromotive force. As such, the current of the winding rotor may be controlled, and thus the torque may be controlled to achieve the objective of speed regulation. Introduction of the controllable electromotive force inevitably forms power transmission in the loop of the windings. The power transmission is bidirectional. That is, the slip power may be transmitted to an external circuit or the power is absorbed from an external circuit. From the perspective of power transmission, such speed adjustment manner may be considered to regulate the output rotation speed by controlling the size and flow direction of the slip power. As such, the winding-type permanent magnet coupling transmission device is mounted between a constant-speed motor and a load system, and is connected to the control structure and the deflector via the collector ring, the carbon brush. The slip power passes through the deflector, and returns back to the feed power grid through the inverter transformer, thereby implementing total recycling and utilization. Therefore, the transmission device in the present invention has very high power efficiency. No matter how s changes, the efficiency may still reach 95% or above. In this way, the speed regulation and energy-saving effect may be implemented in the real sense, and the defect of the permanent magnetic speed regulating device in the prior art may be solved. In conclusion, the winding-type permanent magnet coupling transmission device in the present invention has high transmission efficiency and less energy loss.

4. In the present invention, the permanent magnet comprises a plurality of permanent magnet arrays that mate with each other to form a radial magnetic pole, the plurality of permanent magnet arrays are in an alternate arrangement, and the permanent magnet forms a single-sided magnetic field. The permanent magnet having this structure forms a single-sided magnetic field, and the single-sided magnetic field is close to sine distribution, thereby preventing slant slots or slant poles in the traditional structure, greatly reducing the workload and lowering the manufacture cost. In addition, the air-gap magnetic field density is improved, and the center-offset impact caused by the manufacture is ignored. Compared with the customary design theory, the air-gap magnetic flux may be improved by 41.4% (simulated calculation), and thus few permanent magnets are used, the base wave amplitude of the air-gap magnetic flux density may reach 1.1 to 1.4 T, or even 1.5 to 1.6 T, and the overall power density is high. In addition, the yoke portion of the permanent magnet rotor may be made from a magnetically conductive material or a non-magnetically conductive material. To be specific, the material of the yoke portion of the permanent magnet rotor may be freely selected, and the design flexibility is improved.

5. In the present invention, each of the permanent magnet arrays comprises a plurality of unitary magnetic blocks. The magnetization intensity of each of the unitary magnetic blocks varies regularly, and the acquired sine-shaped air-gap magnetic field does not need to be subjected to an air gap waveform correction by using the traditional manner such as slant slots (or slant poles), non-uniform air gap pole shoes or distributed stator armature windings. In this way, the structure is simplified and the manufacture cost is reduced.

6. In the present invention, the winding rotor comprises a core and coil windings wound on the core in a fractional slot concentrated winding manner, wherein a coil pitch of the coil windings is set to 1, and the number q of slots per pole per phase is ¼ to ½. Using the fractional slot concentrated winding manner, the coils of each coil winding are only wound on one gear of the core, and thus the perimeter of the coils and the extension length at the end portion of the coil are shortened, the resistance of the coil windings is reduced, and thus copper consumption is lowered, thereby improving the efficiency of the device, lowering the time constant and improving the response efficiency. In addition, the end portions of the coils are not overlapped, and thus no insulating material needs to be sandwiched, thereby saving the insulating materials and lowering the cost. Furthermore, each coil is wound on one gear, and automatic manufacture of dedicated winders is facilitated, thereby replacing the traditional manual coil insertion process, and improving the manufacture efficiency.

7. In the present invention, when the permanent rotor or the winding rotor is fixed, the winding-type permanent magnet coupling transmission device may be used as a brake, and the brake is a non-friction brake, thereby improving the operating efficiency and reducing the loss.

BRIEF DESCRIPTION OF THE DRAWINGS

For a better understanding of the disclosure in the embodiments of the present invention, the present invention is described in detail as follows with reference to specific embodiments and accompanying drawings. Among the drawings.

Reference numerals and denotations thereof:
1—permanent magnet; 2—first rotary shaft; 3—housing; 4—core; 41—slot; 5—coil winding; 6—carbon brush; 7—collector ring; 8—second rotary shaft; 9—air gap; 10—fixing disc; 11—first permanent magnet array; 12—second permanent magnet array; 13—first unitary magnetic block; 14—second unitary magnetic block; 15—third unitary magnetic block; 16—fourth unitary magnetic block; 17—control structure; 20—third permanent magnet array; 21—fifth unitary magnetic block; 22—sixth unitary magnetic block; 23—seventh unitary magnetic block; 24—eighth unitary magnetic block.

DETAILED DESCRIPTION

The specific embodiments of the present invention are described in detail hereinafter with reference to the accompanying drawings. It should be understood that the specific embodiments described herein are only intended to explain the present invention instead of limiting the present invention.

Embodiment 1

As illustrated in FIG. 1 to FIG. 6, this embodiment provides a winding-type permanent magnet coupling transmission device, comprising a permanent magnet rotor and a winding rotor that is coaxial with the permanent magnet rotor and capable of rotating relative to the permanent magnet rotor, an air gap 9 existing between the permanent magnet rotor and the winding rotor; wherein the winding rotor is connected to a control structure 17 capable of regulating a current/voltage of the winding rotor. It is known that the torque of the permanent magnet coupling transmission device is determined by both the air gap flux density (provided by the permanent magnet rotor) and the current of the conductor rotor. If the current of the conductor rotor is controlled, the output torque may be regulated with no need to mechanically performing any mechanism.

Figure 1:
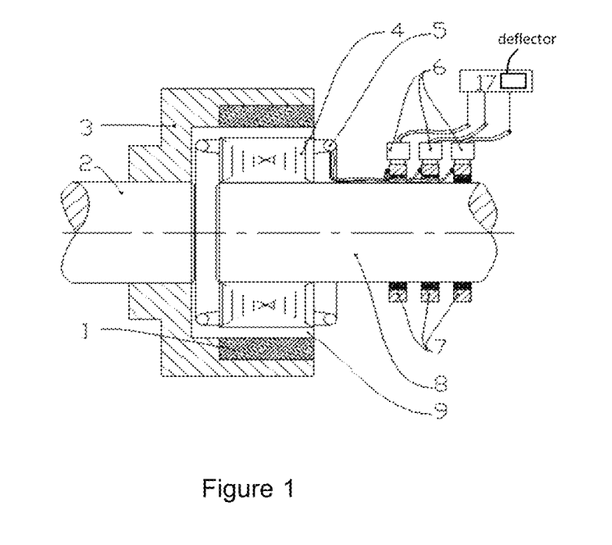
FIG. 1 is a schematic diagram of a winding-type permanent magnet coupling transmission device according to Embodiment 1 of the present invention.

In this embodiment, the control structure 17 may control the current or voltage of the winding rotor, which modifies the concept of regulating the torque by using a mechanical structure in the prior art, and regulating the current/voltage of the winding rotor by smartly arranging a winding rotor and using the control structure 17 of the winding rotor, thereby changing the torque. The control structure in this embodiment is capable of controlling the current or voltage of the winding rotor, so as to regulate the torque of the transmission device, with no need to configure any corresponding mechanical execution mechanism. Therefore, the transmission device has a simple structure and a small volume, and can be simply maintained.

Specifically, in this embodiment, preferably the control structure 17 is connected to the winding rotor via a collector ring 7 and a carbon brush 6; and the control structure comprises a deflector and an inverter transformer, wherein a controllable electromotive force is introduced to the deflector to regulate the current of the winding rotor by regulating the amplitude of the electromotive force.

The control structure 17 according to this embodiment comprises a deflector capable of regulating the current of the winding rotor. Specifically, the deflector may regulate current of the winding rotor by recycling or consuming slip power; wherein the consumption may be inner consumption of the windings or outer consumption, and the recycling may be recycling power to the power grid or recycling power to the other electricity-consuming or energy storage devices. With no problem of loss and heat generation of the slip power theoretically present in the permanent magnetic speed governor technology in the prior art, no heat dissipater and complicated air-cooling or water-cooling system are needed.

Based on the above embodiment, the deflector in this embodiment may also be introduced with a controllable electromotive force to regulate the current of the winding rotor. To be specific, in this embodiment, the winding rotor is connected to a control device, and the control device is introduced with a controllable electromotive force and the amplitude thereof is changed. As such, the current of the winding rotor may be controlled, and thus the torque may be controlled to achieve the objective of speed regulation. Introduction of the controllable electromotive force inevitably forms power transmission in the loop of the windings. The power transmission is bidirectional. That is, the slip power may be transmitted to an external circuit or the power is absorbed from an external circuit. From the perspective of power transmission, such speed regulation manner may be considered to regulate the output rotation speed by controlling the size and flow direction of the slip power. As such, the winding-type permanent magnet coupling transmission device is mounted between a constant-speed motor and a load system, and is connected to the control structure 17 and the deflector via the collector ring 7, the carbon brush 6. The slip power passes through the deflector, and returns back to the feed power grid through the inverter transformer, thereby implementing total recycling and utilization. Therefore, the transmission device in this embodiment has very power efficiency. No matter how s changes, the efficiency may still reach 95% or above. In this way, the speed regulation and energy-saving effect may be implemented in the real sense, and the defect of the permanent magnetic speed regulating device in the prior art may be solved. In conclusion, the winding-type permanent magnet coupling transmission device in this embodiment has high transmission efficiency and less energy loss.

Specifically, the permanent rotor comprises a permanent magnet 1 and a housing 3; wherein the permanent magnet 1 comprises a plurality of permanent magnet arrays that mate with each other to form a radial magnetic pole, the plurality of permanent magnet arrays being in an alternate arrangement, and the permanent magnet 1 forms a single-sided magnetic field. To be specific, in this embodiment of the present invention, the electromagnetic rotation torque may be generated as long as the loop of the coil windings of the winding rotor is closed, and the first rotary shaft mounting the permanent magnet rotor and the second rotary shaft mounting the winding rotor rotate towards the same direction but have different rotation speeds. In this way, effective rotation torque transmission is implemented by using a very simple, reliable and cost-efficient method. In addition, in the present invention, the permanent magnet 1 comprises a plurality of permanent magnet arrays that mate with each other to form a radial magnetic pole, the plurality of permanent magnet arrays are in an alternate arrangement, and the permanent magnet 1 forms a single-sided magnetic field. The permanent magnet 1 having this structure forms a single-sided magnetic field, and the single-sided magnetic field is close to sine distribution, thereby preventing slant slots or slant poles in the traditional structure, greatly reducing the workload and lowering the manufacture cost. In addition, the air-gap magnetic field density is improved, and the center-offset impact caused by the manufacture is ignored. Compared with the customary design theory, the air-gap magnetic flux may be improved by 41.4% (simulated calculation), and thus few permanent magnets are used, the base wave amplitude of the air-gap magnetic flux density may reach 1.1 to 1.4 T, or even 1.5 to 1.6 T, and the overall power density is high. In addition, the yoke portion of the permanent magnet rotor may be made from a magnetically conductive material or a non-magnetically conductive material. To be specific, the material of the yoke portion of the permanent magnet rotor may be freely selected, and the design flexibility is improved.

The operating manner of the winding-type permanent magnet coupling transmission device is different from that of the motor. The winding-type permanent magnet coupling transmission device is configured to transmit or cut off the dynamic torque whereas the motor is configured to generate the dynamic torque. As well known, with respect to the motor, generally the air-gap magnetic field density should not be too high (the base wave amplitude of the air-gap magnetic field density is generally 0.7 to 1.05 T); otherwise, the magnetic density of the sub-gear may be saturated, which results in the increase of iron loss, heat generation, low efficiency or the like of the motor. Generally, with respect to the customary design of the motor, the permanent magnet 1 may be arranged in two manners: internal arrangement and surface mounting. The internal arrangement is divided into parallel magnetic path, serial magnetic path and hybrid structure of parallel magnetic path and serial magnetic path. The surface mounting generally refers to an arc-shaped or magnetic path structure featuring alternate arrangement of tiled radial magnetized N and S poles. These two manners both accommodate the requirements of reaching the base wave amplitude 0.7 to 1.05 T of the air-gap magnetic density. However, with respect to the winding-type permanent magnet coupling transmission device, the base wave amplitude 0.7 to 1.05 T of the air-gap magnetic density is very low. With respect to the winding-type permanent magnet coupling transmission device, to improve the power density, the air-gap magnetic field density may be a great value. The base wave amplitude of the air-gap magnetic density may be 1.1 to 1.4 T, or even 1.5 to 1.6 T. This is because the rotation speed difference between the permanent magnet rotor and the winding rotor is very small. The frequency of the winding rotor is sf (s denotes the slip ratio, and f denotes the frequency of the rotation magnetic field), and generally s is between 0.01 and 0.04. As such, the frequency of the winding rotor is very low. Therefore, the high magnetic density at the gear portion has no great significance. The permanent magnet arrangement in the winding-type permanent magnet coupling device in this embodiment greatly improves the power density, and reduces the cost, such that the winding-type permanent magnet coupling transmission device may be widely applied.

In this embodiment, when there is a relative movement between the permanent magnet rotor and the winding rotor, that is, the first rotary shaft 2 and the second rotary shaft 8 have different rotation speeds, the coil windings 5 may cut the magnetic lines in the magnetic field generated by the permanent rotor to generate an induction electromotive force. When the loop of the coil windings 5 is in a connected state, an induction current may be generated in the coil windings 5. The magnetic field generated by the coil windings 5 with the current flowing in the permanent magnet 1 may be subjected to the effect of the electromagnetic force, thereby implementing transmission of the torque. When the loop of the coil windings 5 is in a disconnected state, the coil windings 5 have an induction electromotive force but have no induction current. Therefore, no electromagnetic torque is generated, which is equivalent to the scenario where the clutch is in a separated state.

Figure 2:
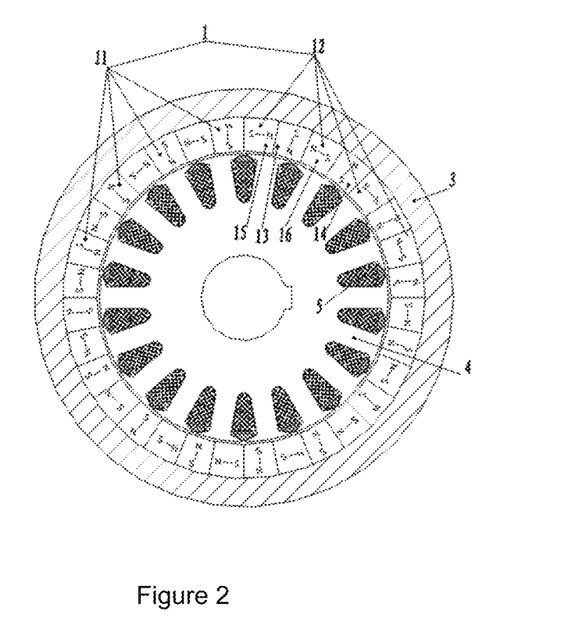
FIG. 2 is a schematic diagram of a permanent magnet according to Embodiment 1 of the present invention.

The array of the permanent magnet 1 comprises a first permanent magnet array 11 that is radially arranged and a second permanent magnet array 12 that is circumferentially orthogonally arranged relative to the first permanent magnet array 11.

Specifically, the first permanent magnet array 11 comprises a first unitary magnetic block 13 and a second unitary magnetic block 14 that are spacedly arranged in pair, directions of magnetic fields the first unitary magnetic block 13 and the second unitary magnetic block 14 being respectively an inner direction and an outer direction along a radius direction of the permanent magnet 1; the second permanent magnet array 12 comprises a third unitary magnetic block 15 and a fourth unitary magnetic block 16 that are spacedly arranged in pair, directions of magnetic fields of the third unitary magnetic block 15 and the fourth unitary magnetic block 16 being respectively a clockwise direction and a counterclockwise direction along a circumferential tangential direction of the permanent magnet 1; wherein alternate arrangement of the first permanent magnet array 11 and the second permanent magnet array 12 satisfies the following relationship: the first unitary magnetic block 13 is arranged between the third unitary magnetic block 15 and the fourth unitary magnetic block 16 that neighbor to each other, and the fourth unitary magnetic block 16 is arranged between the first unitary magnetic block 13 and the second unitary magnetic block 4 that neighbor to each other.

Figure 3:
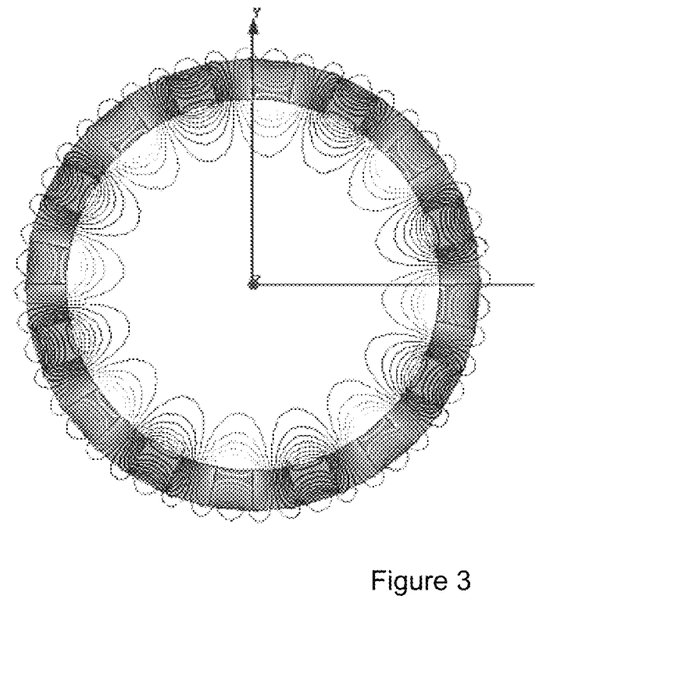
FIG. 3 is a schematic diagram of a magnetic field of the permanent magnet according to Embodiment 1 of the present invention.

In this embodiment, as illustrated in FIG. 2, preferably the first permanent magnet array 11 comprises eight first unitary magnetic blocks 13 and eight second unitary magnetic blocks 14, and the second permanent magnet array 12 comprises right third unitary magnetic blocks 15 and eight fourth magnetic blocks 16; in the above structure, a magnetic induction line as illustrated in FIG. 3 may be obtained from the permanent magnet 1, that is, the magnetic field is a single-line magnetic field, and an air-gap magnetic field close to sine may be acquired.

The permanent magnet 1 further comprises 2n permanent magnet arrays (n=1, 2, 3 . . . ) nested between the first permanent magnet array 11 and the second permanent magnet array 12, wherein these permanent magnet arrays act with the first and second permanent arrays to form the single-sided magnetic field. The magnetization intensity vector M of the unitary magnetic bock of the permanent magnet array varies regularly, that is, θm=(1+p)θ or θm=(1−p)θ(p=1, 2, 3 . . . ). In the equation, p denotes the number of pole pairs, θm denotes an included angle between the magnetization intensity vector M and the X axis, and θ denotes an included angle between the radius of a sector unitary magnetic block and the X axis. In this embodiment, each of the permanent magnet arrays comprises a plurality of unitary magnetic blocks. The magnetization intensity of each of the unitary magnetic blocks varies regularly, and the acquired sine-shaped air-gap magnetic field does not need to be subjected to an air gap waveform correction by using the traditional manner such as slant slots (or slant poles), non-uniform air gap pole shoes or distributed stator armature windings. In this way, the structure is simplified and the manufacture cost is reduced.

Figure 4:
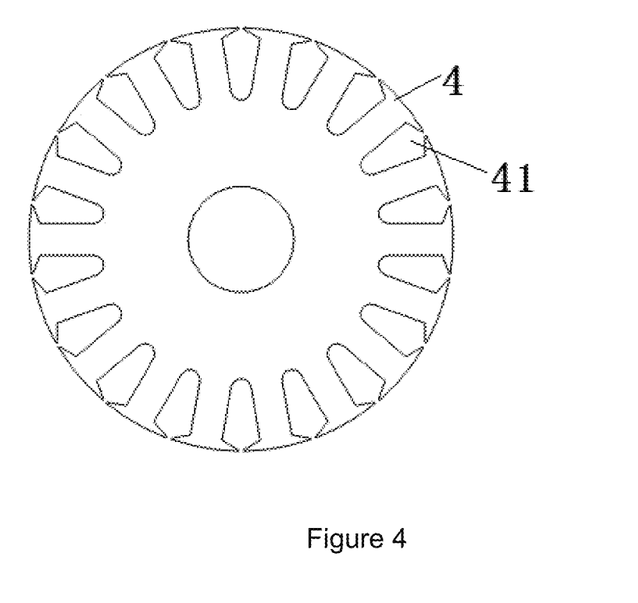
FIG. 4 is a schematic diagram of a core according to Embodiment 1 of the present invention.
Figure 5:
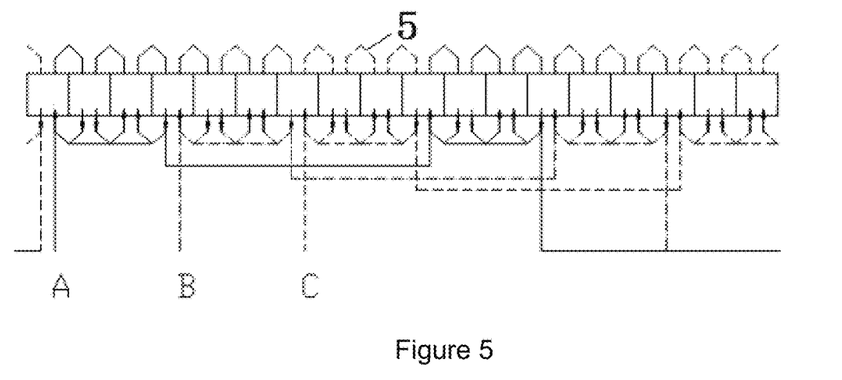
FIG. 5 is a schematic exploded diagram of a coil winding according to Embodiment 1 of the present invention.

Further, based on the above embodiment, the winding rotor comprises a core 4 and coil windings 5 wound on the core 4 in a fractional slot concentrated winding manner, a coil pitch of the coil windings 5 being set to 1. After the coil windings 5 of the winding rotor are wound in the fractional slot concentrated winding manner, in one aspect, the number of slots per pole per phase is greatly reduced over the common design, and in another aspect, the reduction of the number of slots greatly reduces the volume of the winding-type permanent magnet coupling transmission device, thereby providing the power density.

In the theory of electrical machinery, the number of pole pairs of the winding rotor needs to be equal to the number of pole pair of the stator. According to the customary design of winding distribution, for example, the design of a three-phase 16-pole motor, the winding rotor punching plates needs at least 48 slots. In this case, the number of slots per pole per phase q=1. According to the theory of motors, generally it is specified that 2<q<6. Therefore, in an ideal design, the three-phase 16-pole motor needs at least 96 slots (q=2). To ensure that sufficient copper wires are arranged, the area of the slots needs to be sufficiently large. To ensure that the magnetic density at the gear portion is not oversaturated, the gear portion needs to be sufficiently wide. Inevitably, the diameter of the winding rotor needs to be increased. As such, the volume of the entire device is great, and thus the high power density may not be achieved.

When coils of the winding rotor employs a fractional slot concentrated winding manner, the number of slots q per pole per phase may be selected between ¼ and ½. Compared with 2<q<6 in the customary design, the number of slots of the punching plates of the winding rotor is only ⅛ to ½ thereof. For example, as described above, the three-phase 16-pole motor having 96 slots may employ the design of 18 slots and 16 poles. In this embodiment, the design of 16 poles and 18 slots is employed. The reduction of the number of slots greatly reduces the volume of the device, and improves the power density.

Application of the fractional slot concentrated winding in the design of motors is subject to limitations, because constant-speed motors may be subject to limitations by the rotation speed requirement imposed by the working conditions. The rotation speed determines the number of poles, that is, during the design of a motor, selection of the number of poles may be subject to some limitations. However, the winding-type permanent magnet slip clutch operates different from the motor, and the winding-type permanent magnet slip clutch only transmits the torque by using the rotation speed difference between the permanent rotor and the winding rotor. Therefore, the winding-type permanent magnet slip clutch has no limitation to the number of poles which may be defined randomly. In this way, a most suitable combination of the number of slots and the number of poles may be conveniently selected. Therefore, application of the fractional slot concentrated winding to the winding-type permanent magnet slip clutch greatly reduces the volume of the structure of the device.

Specifically, as illustrated in FIG. 4, the core 4 is arranged to be a laminated core, a plurality of slots for winding of the coils being formed on the laminated core. The number of slots is set to 3n (n=1, 2, 3 . . . ). In this embodiment, three-phase winding Y-connection is employed, and n is preferably set to 6, that is, the number of slots is 18. In addition, as illustrated in FIG. 5, the coil windings 5 are preferably set to double-layer windings. That is, three phases A, B and C are configured, wherein each phase has six groups of coil windings. Nevertheless, the coil windings 5 may also be set to single-layer windings.

In this embodiment, preferably, the core 4 is made from an electrical silicon steel sheet, wherein any two electrical silicon steel sheets are insulated from each other. Using the fractional slot concentrated winding manner, the coils of each coil winding 5 are only wound on one gear of the core 4, and thus the perimeter of the coils and the extension length at the end portion of the coil are shortened, the resistance of the coil windings 5 is reduced, and thus copper consumption is lowered, thereby improving the efficiency of the device, lowering the time constant and improving the response efficiency. In addition, the end portions of the coils are not overlapped, and thus no insulating material needs to be sandwiched, thereby saving the insulating materials and lowering the cost. Furthermore, each coil is wound on one gear, and automatic manufacture of dedicated winders is facilitated, thereby replacing the traditional manual coil insertion process, and improving the manufacture efficiency.

Embodiment 2

Figure 6:
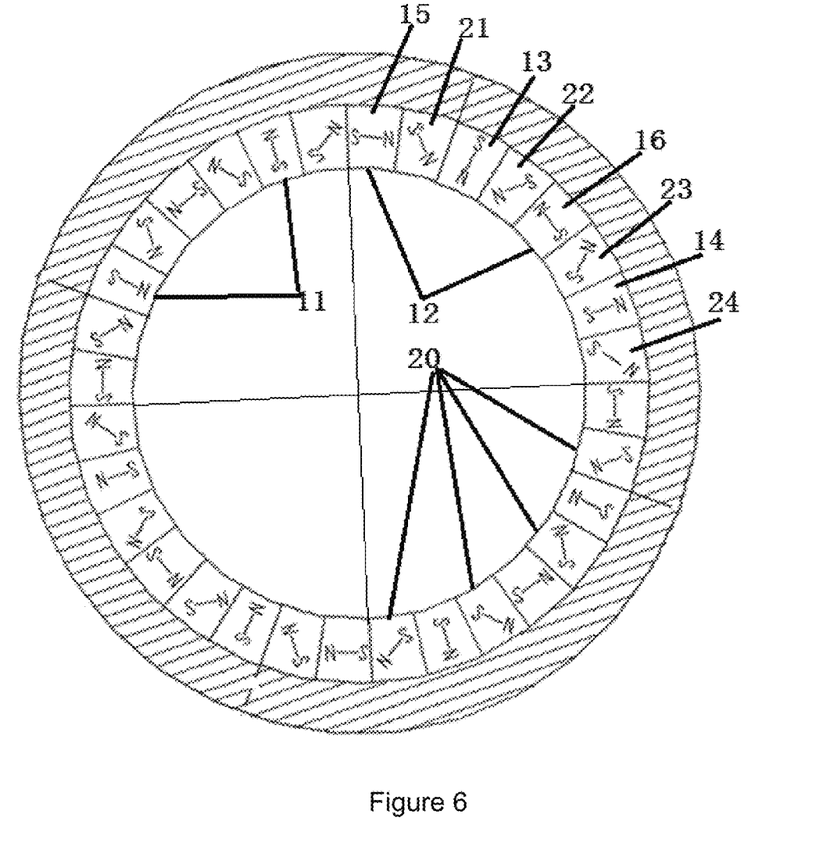
FIG. 6 is a schematic diagram of a permanent magnet according to Embodiment 2 of the present invention.

As an alternate embodiment, this embodiment is different from Embodiment 1 in that:

Based on Embodiment 1, the permanent magnet array according to this embodiment further comprises a third permanent magnet array 20 nested between the first permanent magnet array 11 and the second permanent magnet array 12; wherein directions of magnetic fields of the first permanent magnet array 11, the second permanent magnet array 12 and the third permanent magnet array 20 respectively form a first included angle, a second included angle and a third included angle that are not obtuse angles, with the corresponding radii, angle differences between the first included angle, the second included angle and the third included angle being respectively 45 degrees.

Specifically, the third permanent magnet array 20 comprises a fifth unitary magnetic block 21, a sixth unitary magnetic block 22, a seventh unitary magnetic block 23 and an eighth unitary magnetic block 24 that are sequentially spacedly arranged; wherein the fifth unitary magnetic block 21 is nested between the third unitary magnetic block 15 and the first unitary magnetic block 13, the sixth unitary magnetic block 22 is nested between the first unitary magnetic block 13 and the fourth unitary magnetic block 16, the seventh unitary magnetic block 23 is nested between the fourth unitary magnetic block 16 and the second unitary magnetic block 14, and the eighth unitary magnetic block 24 is nested between the second unitary magnetic block 14 and the third unitary magnetic block 15.

Figure 7:
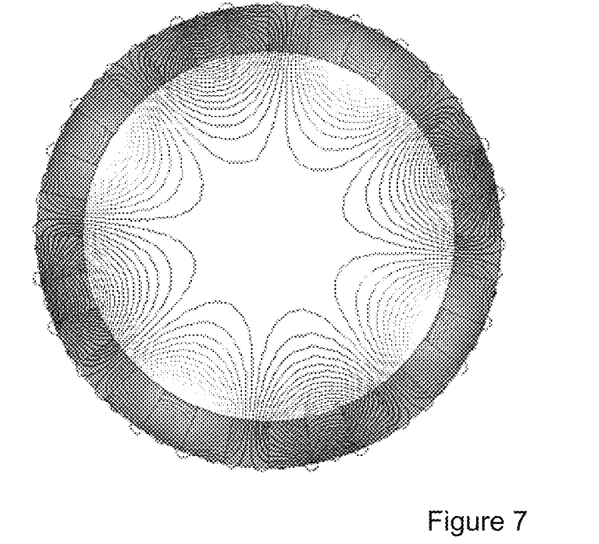
FIG. 7 is a schematic diagram of a magnetic field of the permanent magnet according to Embodiment 2 of the present invention.

In this embodiment, as illustrated in FIG. 6, preferably the first permanent magnet array 11 comprises four first unitary magnetic blocks 13 and four second unitary magnetic blocks 14, the second permanent magnet array 12 comprises four third unitary magnetic blocks 15 and four fourth unitary magnetic blocks 16, and the third permanent magnet array 21 comprises four fifth unitary magnetic blocks 21, fourth sixth unitary magnetic blocks 22, four seventh unitary magnetic blocks 23 and four eighth unitary magnetic blocks 24. The magnetic block in the above structure may obtain the magnetic induction line as illustrated in FIG. 7, that is, the magnetic field line is a single-line magnetic field, and a sine-shaped air-gap magnetic field is acquired.

Nevertheless, a plurality of permanent magnet arrays may also be arranged according to this embodiment, for example, a fourth permanent magnet array. In this case, directions of the magnetic fields of the first permanent magnet array 11, the second permanent magnet array 12, the third permanent magnet array 20 and the fourth permanent magnet array respectively form a first included angle, a second included angle, a third included angle and a fourth included angle that are not obtuse angles, with the corresponding radii, angle differences between the first included angle, the second included angle, the third included angle and the fourth included angle being respectively 45 degrees. Nevertheless, a fourth permanent magnet array and a fifth permanent magnet array may also be simultaneously arranged, and the angle difference therebetween may be also defined to 30 degrees.

As an alternate embodiment, more permanent magnet arrays may be arranged between the first permanent magnet array 11 and the second permanent magnet array 12, and the angle variations between the additionally arranged permanent magnet arrays may be set to a smaller value, to finally obtain a sine-shaped single-sided magnetic field.

Embodiment 3

Figure 8:
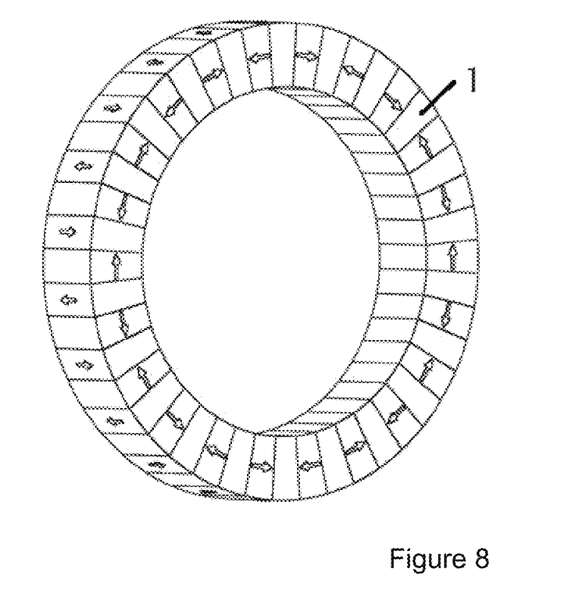
FIG. 8 is a schematic diagram of a permanent magnet according to Embodiment 3 of the present invention.

As an alternate embodiment, this embodiment is different from Embodiment 1 in that:

In this embodiment, the specific structures between the permanent magnet arrays are as illustrated in FIG. 8. A single-sided magnetic field may be obtained from the permanent magnet 1 having the above structure, and a sine air-gap magnetic field close to a sine shape may be obtained.

Figure 9:
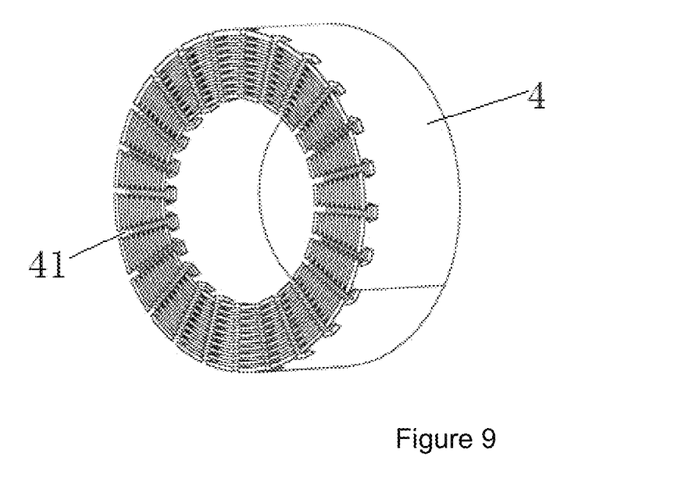
FIG. 9 is a schematic diagram of a core according to Embodiment 3 of the present invention.

Further, in this embodiment, the core 4 is arranged to be a wound core, and a plurality of slots for winding of the coils are formed on the wound core. The number of slots is set to 3n (n=1, 2, 3 . . . ). In this embodiment, preferably n is set to 8, that is, the number of slots is set to 24, and the specific structure is as illustrated in FIG. 9.

Embodiment 4

Figure 10:
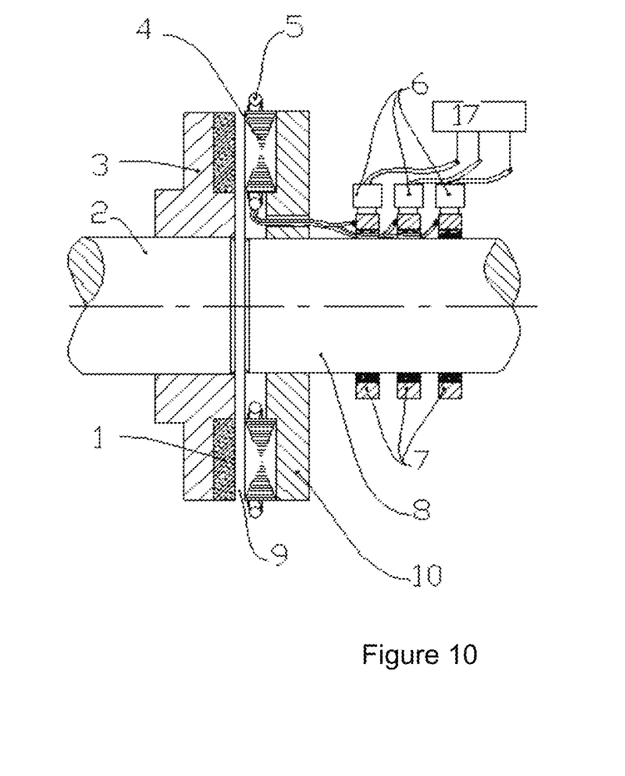
FIG. 10 is a schematic diagram of a winding-type permanent magnet coupling transmission device according to Embodiment 4 of the present invention.

As an alternate embodiment, this embodiment is different from Embodiment 1 in that:

The winding rotor and the permanent magnet rotor are arranged coaxially and horizontally, and the winding rotor is mounted on the second rotary shaft 8 via a fixing disc 10, as illustrated in FIG. 10.

Embodiment 5

Figure 11:
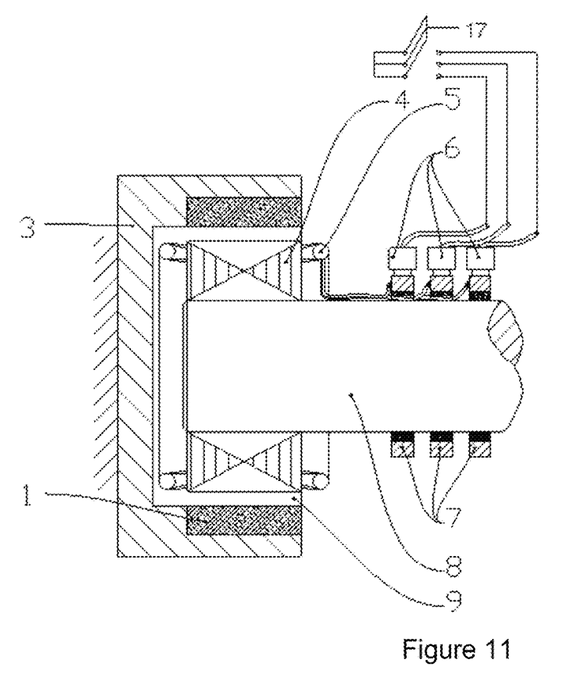
FIG. 11 is a schematic diagram of a winding-type permanent magnet coupling transmission device according to Embodiment 5 of the present invention.

Based on Embodiments 1 to 6, application of the winding-type permanent magnet coupling transmission device according to Embodiments 1 to 7 is further provided. The winding-type permanent magnet coupling transmission device is applied as a brake based on the following principles: the permanent magnet rotor is fixed, and when the coil windings 5 of the winding rotor are closed, the winding rotor achieves braking step by step under the driving of the second rotary shaft 8, thereby implementation the functionality of the brake, as illustrated in FIG. 11.

Embodiment 6

Figure 12:
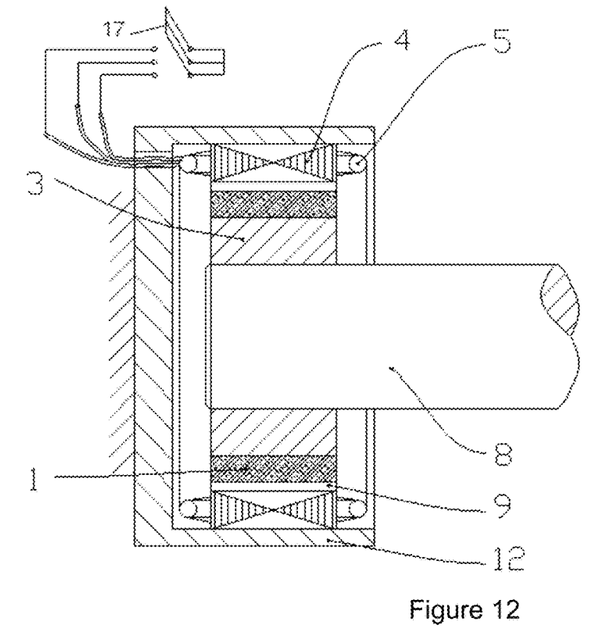
FIG. 12 is a schematic diagram of a winding-type permanent magnet coupling transmission device according to Embodiment 6 of the present invention.

Based on Embodiments 1 to 6, application of the winding-type permanent magnet coupling transmission device according to Embodiments 1 to 7 is further provided. The winding-type permanent magnet coupling transmission device is applied as a brake based on the following principles: the winding rotor is fixed, and when the coil windings 5 of the winding rotor are closed, the permanent magnet rotor achieves braking step by step under the driving of the first rotary shaft 2, thereby implementation the functionality of the brake, as illustrated in FIG. 12.

Obviously, the above embodiments are merely exemplary ones for illustrating the present invention, but are not intended to limit the present invention. Persons of ordinary skills in the art may derive other modifications and variations based on the above embodiments. All embodiments of the present invention are not exhaustively listed herein. Such modifications and variations derived still fall within the protection scope of the present invention.

What is claimed is:

1. A winding-type permanent magnet coupling transmission device, comprising a permanent magnet rotor and a winding rotor that is coaxial with the permanent magnet rotor and capable of rotating relative to the permanent magnet rotor, an air gap existing between the permanent magnet rotor and the winding rotor; wherein the winding rotor is connected to a control structure capable of regulating the current/voltage of the winding rotor and the winding rotor comprises a core and coil windings wound on the core in a fractional slot concentrated winding manner, a coil pitch of the coil windings being set to 1.

2. The winding-type permanent magnet coupling transmission device according to claim 1, wherein the control structure is connected to the winding rotor via a collector ring and a carbon brush.

3. The winding-type permanent magnet coupling transmission device according to claim 1, wherein the control structure comprises a deflector capable of regulating the current of the winding rotor.

4. The winding-type permanent magnet coupling transmission device according to claim 3, wherein the deflector is configured to regulate the current of the winding rotor by recycling or consuming slip power.

5. The winding-type permanent magnet coupling transmission device according to claim 3, wherein a controllable electromotive force is introduced to the deflector to regulate the current of the winding rotor.

6. The winding-type permanent magnet coupling transmission device according to claim 1, wherein the permanent rotor comprises a permanent magnet and a housing; wherein the permanent magnet comprises a plurality of permanent magnet arrays that mate with each other to form a radial magnetic pole, the plurality of permanent magnet arrays being in an alternate arrangement, and the permanent magnet forms a single-sided magnetic field.

7. The winding-type permanent magnet coupling transmission device according to claim 6, wherein the permanent magnet array comprises a first permanent magnet array that is radially arranged and a second permanent magnet array that is circumferentially orthogonally arranged relative to the first permanent magnet array.

8. The winding-type permanent magnet coupling transmission device according to claim 7, wherein the first permanent magnet array comprises a first unitary magnetic block and a second unitary magnetic block that are spacedly arranged in pair, directions of magnetic fields of the first unitary magnetic block and the second unitary magnetic block being respectively an inner direction and an outer direction along a radius direction of the permanent magnet; the second permanent magnet array comprises a third unitary magnetic block and a fourth unitary magnetic block that are spacedly arranged in pair, directions of magnetic fields of the third unitary magnetic block and the fourth unitary magnetic block being respectively a clockwise direction and a counterclockwise direction along a circumferential tangential direction of the permanent magnet; wherein the first unitary magnetic block is arranged between the third unitary magnetic block and the fourth unitary magnetic block that neighbor to each other, and the fourth unitary magnetic block is arranged between the first unitary magnetic block and the second unitary magnetic block that neighbor to each other.

9. The winding-type permanent magnet coupling transmission device according to claim 8, wherein the permanent magnet further comprises 2n permanent magnet arrays nested between the first permanent magnet array and the second permanent magnet array, wherein these permanent magnet arrays act with the first and second permanent arrays to form the single-sided magnetic field.

10. The winding-type permanent magnet coupling transmission device according to claim 8, wherein the permanent magnet array further comprises a third permanent magnet array nested between the first permanent magnet array and the second permanent magnet array; wherein directions of magnetic fields of the first permanent magnet array, the second permanent magnet array and the third permanent magnet array respectively form a first included angle, a second included angle and a third included angle that are not obtuse angles, with the corresponding radii, angle differences between the first included angle, the second included angle and the third included angle being respectively 45 degrees.

11. The winding-type permanent magnet coupling transmission device according to claim 10, wherein the third permanent magnet array comprises a fifth unitary magnetic block, a sixth unitary magnetic block, a seventh unitary magnetic block and an eighth unitary magnetic block that are sequentially spacedly arranged; wherein the fifth unitary magnetic block is nested between the third unitary magnetic block and the first unitary magnetic block, the sixth unitary magnetic block is nested between the first unitary magnetic block and the fourth unitary magnetic block, the seventh unitary magnetic block is nested between the fourth unitary magnetic block and the second unitary magnetic block, and the eighth unitary magnetic block is nested between the second unitary magnetic block and the third unitary magnetic block.

12. The winding-type permanent magnet coupling transmission device according to claim 1, wherein the number q of slots per pole per phase is ¼ to ½.

13. The winding-type permanent magnet coupling transmission device according to claim 1, wherein the coil windings are arranged to be double-layer windings or single-layer windings.

14. The winding-type permanent magnet coupling transmission device according to claim 13, wherein the number of slots is set to 3n.

15. The winding-type permanent magnet coupling transmission device according to claim 1, wherein the core is arranged to be a laminated core, a plurality of slots for winding of the coils being formed on the laminated core.

16. The winding-type permanent magnet coupling transmission device according to claim 1, wherein the core is arranged to be a wound core, a plurality of slots for winding of the coils being formed on the wound core.

17. The winding-type permanent magnet coupling transmission device according to claim 1, wherein the core is made from an electrical silicon steel sheet.

* * * * *